Figure 3:
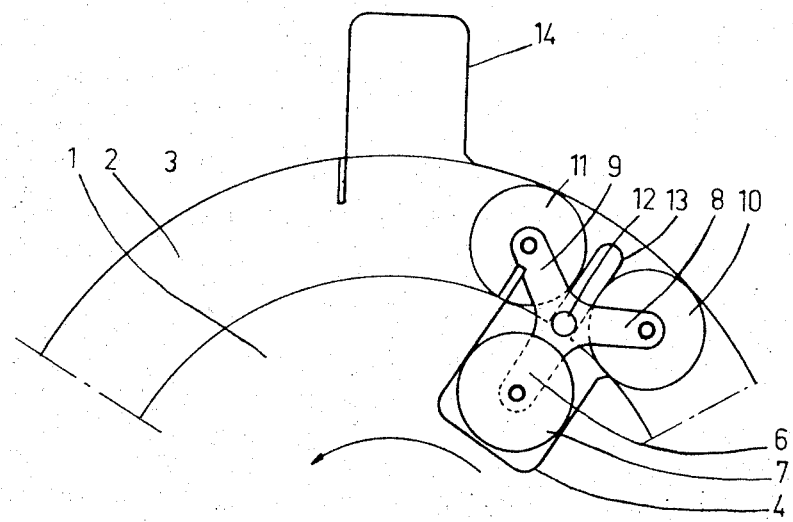

United States Patent [19]
Garnier

[11] 3,744,603
[45] July 10, 1973

[54] POSITIVE CLUTCH AND BRAKE WITH LIMIT SWITCH

[75] Inventor: Jacques Garnier, Le Chesnay, France

[73] Assignee: Institut Francais du Petrole, des Carburants et Lubrifiants, Rueil-Malmaison, France

[22] Filed: June 15, 1971

[21] Appl. No.: 153,348

[30] Foreign Application Priority Data
June 18, 1970  France .............................. 7022622

[52] U.S. Cl. .................... 192/16, 192/27, 192/71, 192/142 R
[51] Int. Cl. ............................................ F16d 67/02
[58] Field of Search ..................... 192/7, 16, 38, 27, 192/142 R

[56] References Cited
UNITED STATES PATENTS

| | | | |
|---|---|---|---|
| 3,039,133 | 6/1962 | Milton et al. | 192/16 X |
| 1,006,806 | 10/1911 | Trog | 192/27 |
| 1,980,757 | 11/1934 | Janda | 192/27 |
| 3,406,797 | 10/1968 | Toussaint | 192/27 |
| 3,554,337 | 1/1971 | Denkowski | 192/8 |

Primary Examiner—Benjamin W. Wyche
Attorney—Craig, Antonelli & Hill

[57] ABSTRACT

Device for stopping a moveable member at a position defined with accuracy with respect to an adjacent stationary element carrying a stopping member, comprising the combination of recess means in said stationary element and in an intermediary element driving in motion said moveable member through connection means and clenching means cooperating with said recess means so as to interlock said connecting means and said intermediary element until the recess means thereof registers with the recess means of said stationary element and to interlock said stationary element with said connecting means while disconnecting the latter from said intermediary element, at the time when said recess means register, thereby resulting in the stopping of said connection means at an accurately defined position, and in the corresponding stopping of the moveable member driven in motion therewith.

14 Claims, 12 Drawing Figures

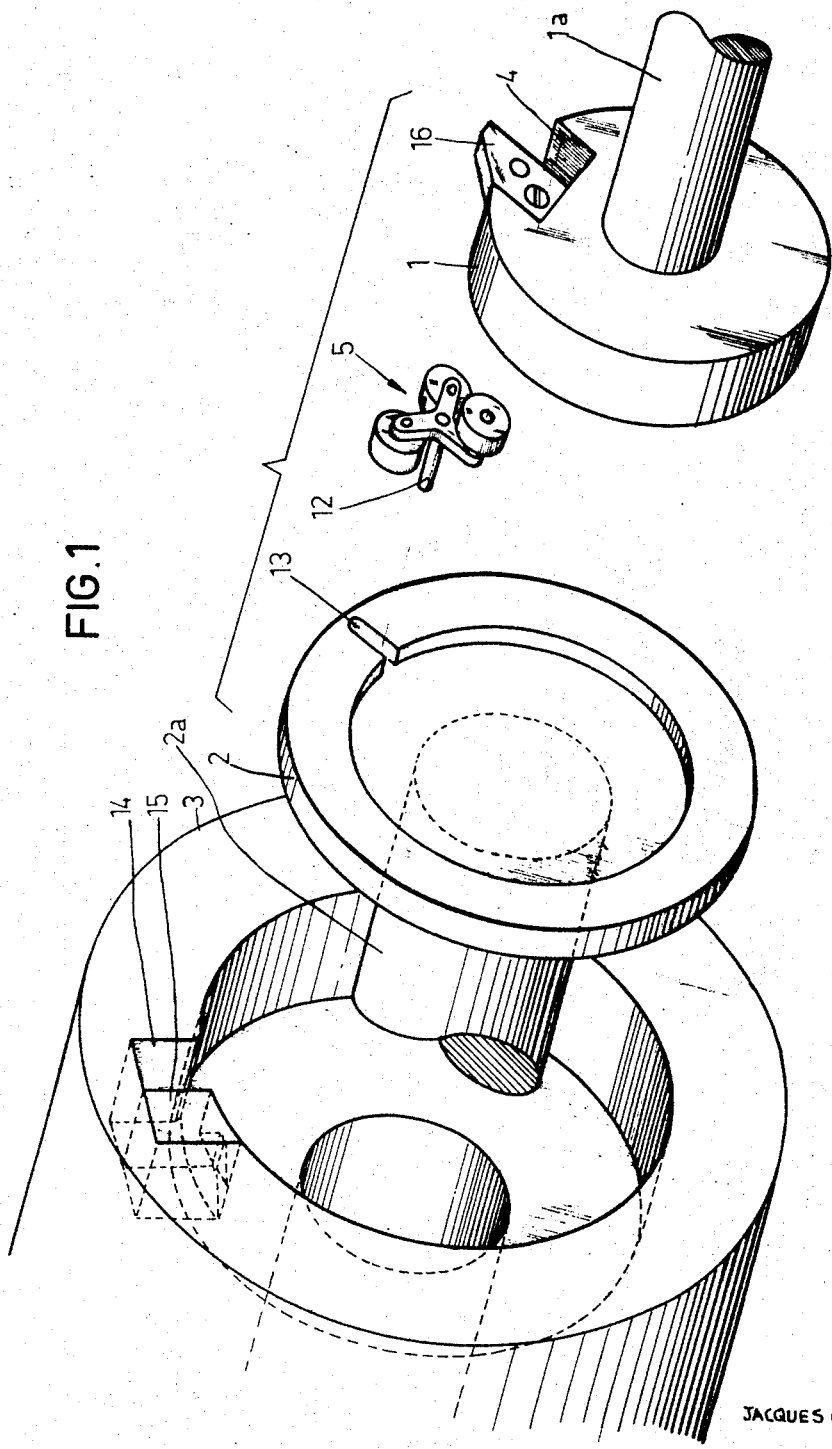

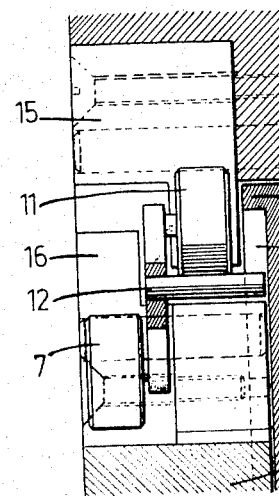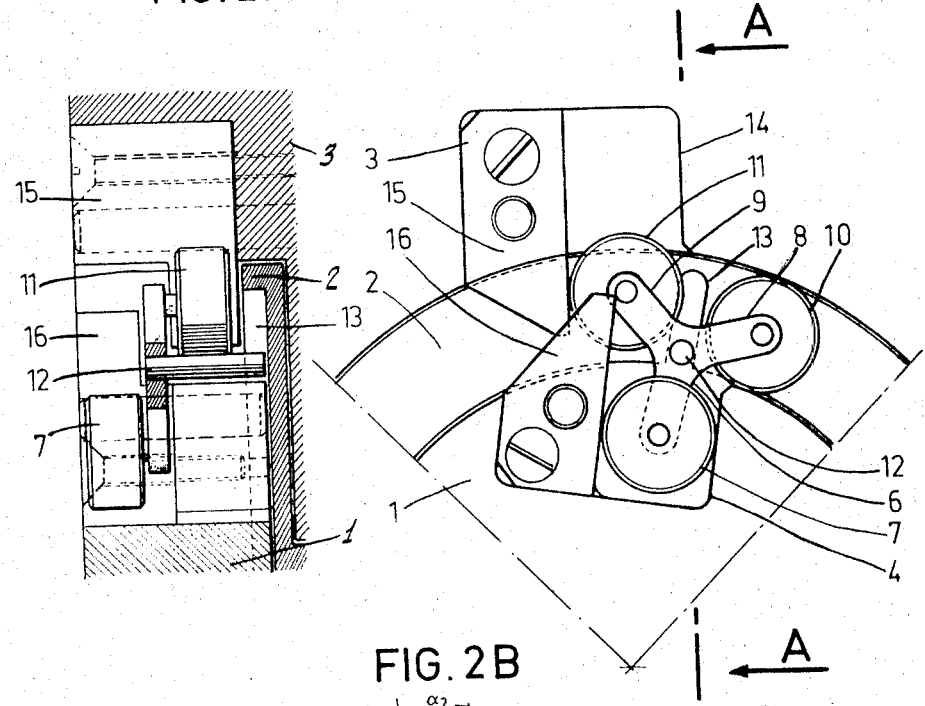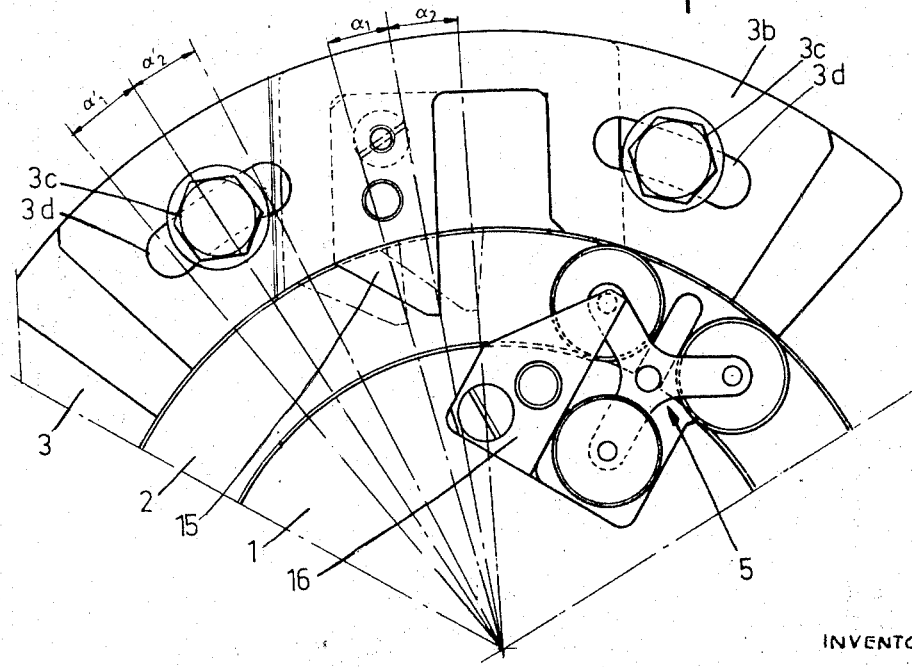

INVENTOR
JACQUES GARNIER
BY Craig, Antonelli & Hill
ATTORNEYS

POSITIVE CLUTCH AND BRAKE WITH LIMIT SWITCH

This invention, made by Jacques GARNIER Engineer at ERAP-SOFREP Company in co-operation with Institut Francais du Petrole, des Carburants et Lubrifiants, relates to a device for stopping, at an accurately defined position, a member driven in motion.

This device is adapted, but not limited, to the use for stopping in an accurately defined position, the moveable part of a valve or a barrel remotely controlled, equipping an oil well head, or a duct circuit adapted for passing tools therethrough.

The devices used up to now comprise a stationary mechanical abutment stopping the moveable member. These devices suffer from the drawback of not preventing slight back motions of the moveable member elements stopped by the abutment, these back motions resulting from mechanical clearances, vibrations or, in the case of a moveable member traversed by a pressurized fluid, to slight variations in the fluid pressure.

This is a very serious inconvenience, in particular in the case of a valve or a barrel-incorporating member whose moveable member must be placed, by remote control, to an exactly defined position at which two ducts are interconnected, since an even very small error in the position of said moveable member may result in the impossibility of passing tools or instruments from one duct to the other through the barrel or valve or in the jamming of said tools inside the barrel or the valve.

This problem could not yet be solved by using electric micro-contacts actuated when the moveable member reaches the desired position, since such a device does not provide for the remote control of the stopping of the moveable element with a sufficient accuracy at a predetermined position, in view of the irregularity in the response time of the electric contacts and the irregular friction stresses to which is subjected the moveable member.

It is an object of the present invention to provide a device which does not suffer from the above-mentioned disadvantages and makes possible, even by remote control, to stop a member driven in motion at a predetermined position, with accuracy.

This object is achieved, according to the invention, by means of a device comprising a first element connected to a driving motor and provided with driving means, a second element connected to the member to be driven and a third element which is stationary, bearing a stop member, said device further comprising the combination of locking means carried by said third stationary element with connection means carried by said second element, said connection means co-operating with said driving means to produce the displacement of said second element through the intermediary of said first element, and clenching means disconnecting from one another said driving means and said connection means and disengaging said first and said second elements, at the level of said abutment member, while simultaneously engaging said connection means and said locking means into one another, thereby rigidly locking said second and said third elements to each other.

According to a particular embodiment wherein said locking means and said driving means consist of two recesses respectively arranged in said third and in said first element and in which can be engaged means for interlocking said connection means, said first and third elements are spaced apart from each other in a direction perpendicular to the moving direction of said second element, defining therebetween a guiding path for said connection member, the width of which is substantially the same as that of the housings and the connection means comprise a plurality of arms forming the interlocking means, said arms being articulated about a pivot supported by said second element and ending with rollers a first of which may be engaged with a slight clearance into a first of said housings, while at least one second roller is maintained in said guiding path until the displacement of said second element, by bringing said housings closer to one another, makes possible the engagement of the second roller into said second housing with a simultaneous disengagement of said first roller from said first housing, by revolution of said interlocking arms about said pivot in response to the actuation of said clenching means.

Figure 7:
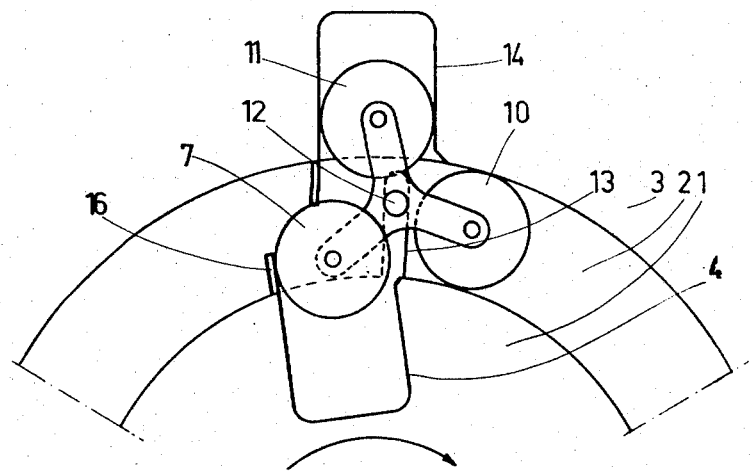
Figure 8:
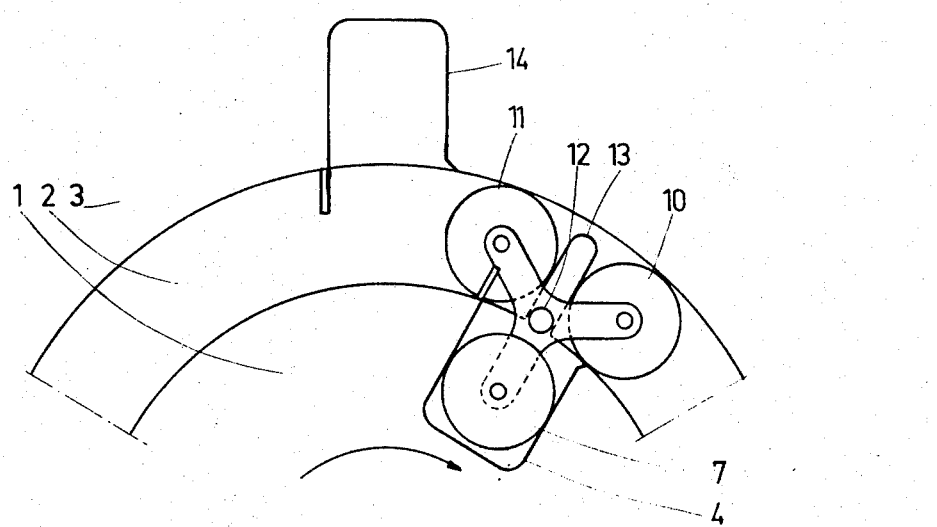
Figure 9:
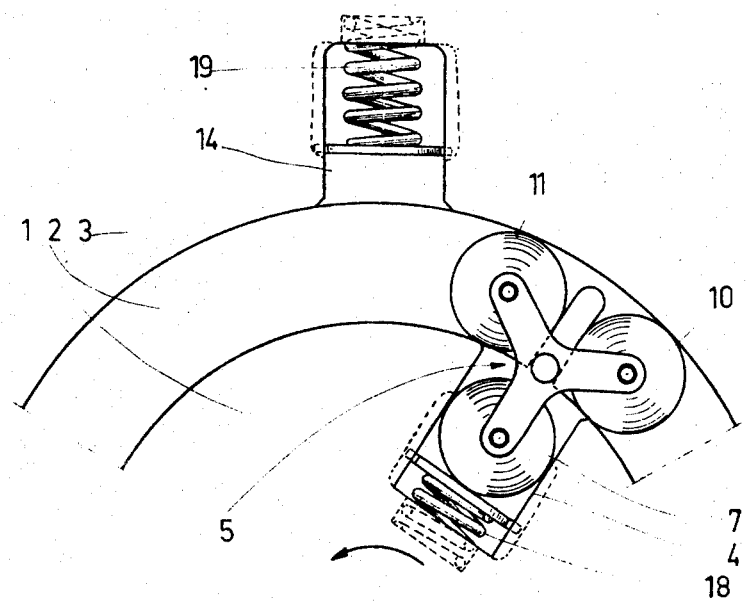
Figure 10:
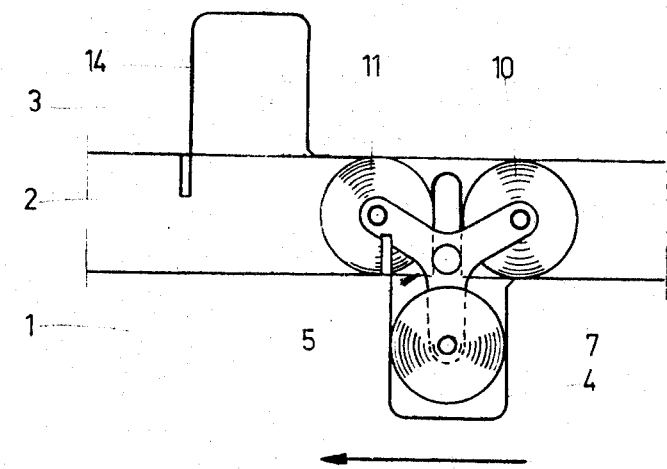

Non limitative embodiments of the invention are illustrated in the accompanying drawings wherein:

FIG. 1 diagrammatically shows the components of a device according to this invention, adapted to the case where the control of the member driven in motion is achieved by rotation, FIG. 2 shows a detailed view of this embodiment, FIG. 2A is a cross section along line A—A of the device of FIG. 2, FIG. 2B shows a preferred embodiment of the device, FIGS. 3 to 8 diagrammatically illustrate the operation of the device, FIG. 9 shows a change in the detail of the device of FIGS. 2 and 2A and, FIG. 10 illustrates the case where the moving parts of the device are driven in a rectilinear motion.

In the embodiment illustrated in FIGS. 1 to 8, the device comprises a first element 1 connected to a driving member 1a, a second element 2 connected to the member to be driven 2a which, in the present case is a rotatably controlled member such as the body of a valve or a barrel, and a third stationary element 3.

The first element comprises means for driving the controlled member, said means comprising in the present example, a recess 4 wherein can be engaged connection means 5 carried on element 2, said connection means comprising, in the present embodiment, catch arms or lugs such as arm 6 ending with a roller 7 engaged in the recess 4 with a slight play (see FIG. 2).

The connection means comprise, in the present example, two further arms 8 and 9 also ending with rollers, respectively rollers 10 and 11, of the same diameter as roller 6.

The arms 6, 8 and 9 which have the same length are extending from a lug 12 solid therewith in directions forming angles of substantially 120° between them. This lug 12 is engaged with a slight play into a part hole or button hole 13 extending lengthwise in a radial direction, arranged in element 2 at the level of a guiding path left free between elements 1 and 3 for receiving with a small clearance the set of rollers such as 10 and 11 (FIG. 3).

The stationary element 3 comprises means for stopping and locking the connection member carried on element 2, said locking means consisting in the examplified case, of a recess 14 adapted to receive with a slight play the rollers of the connection member.

As illustrated in FIG. 2B, the recess 14 is provided in an element 3b fastened to element 3 through screws 3c. Port holes 3d are provided for adjusting the position of recess 14 with respect to the position of recess 4. Of course it is also possible to make use of a similar device for adjusting the position of recess 4.

The device also comprises clenching means which, in the illustrated embodiment of FIGS. 2 and 2A, consist of abutments 15 and 16, respectively carried by elements 1 and 2.

When, by the movement of element 2, the recesses 4 and 14 come closer to each other, these abutments cause the connection means provided with the catch arms 6, 8 and 9, to pivot, thereby disengaging one of said arms from one of the two recesses 4 and 14 and simultaneously engaging another of said arms 6, 8 and 9 in the other recess.

FIGS. 3 to 8 illustrate the operation of this device.

When the driving motor M (shown schematically in FIG. 5) is actuated, it drives in rotation the element 1.

In the position shown in FIG. 3, the roller 7 is engaged in the recess 4 of element 1, the rollers 10 and 11 roll along the guiding path provided between elements 1 and 3, the connection member 5 driving the element 2 and therefore the body of the valve or the barrel solid therewith.

Figure 4:
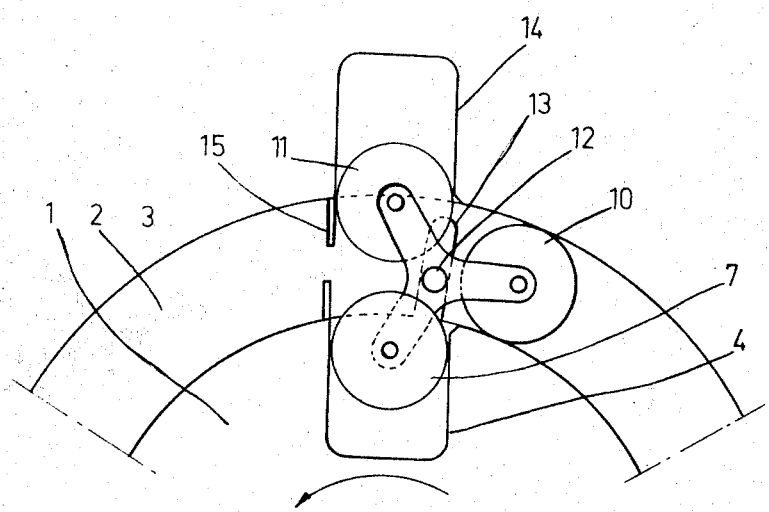

In the position of FIG. 4 the roller 11 is stopped by a ramp or abutment 15 solid with element 3 and engaged into the recess 14 of element 3, simultaneously forcing the roller 7 out of recess 4 of element 1.

Figure 5:
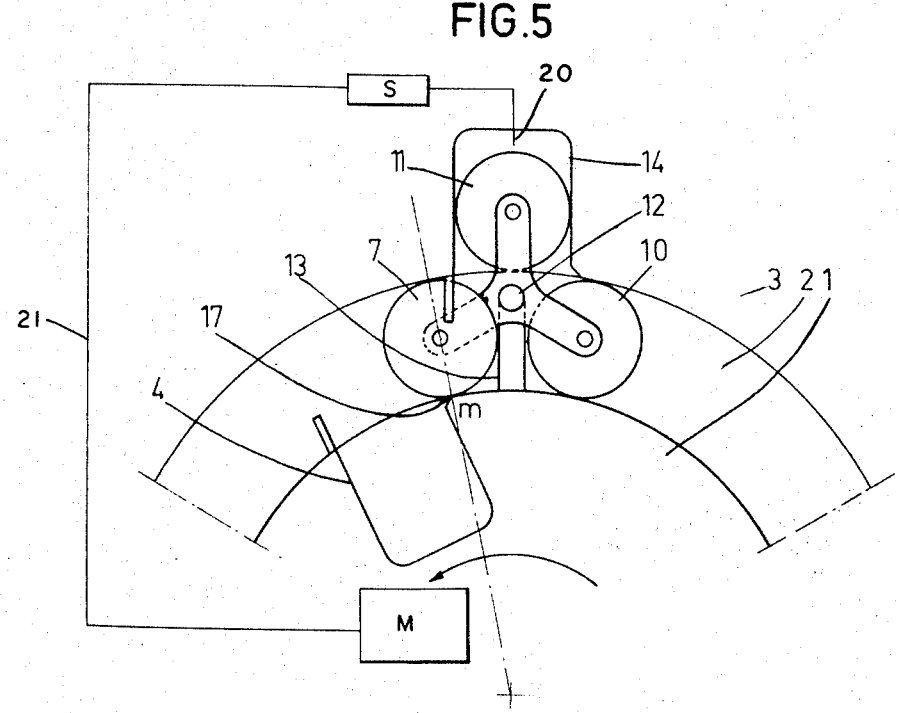

In the position of FIG. 5, the roller 7 is just (at point 17) completely out of recess 4 of element 1 and the roller 11 is completely housed in recess 14 of element 3. The element 2 is therefore stopped in an irreversible manner with respect to element 3 and the element 1 may continue its rotation without driving therewith the element 2 and the valve body or barrel.

Figure 6:
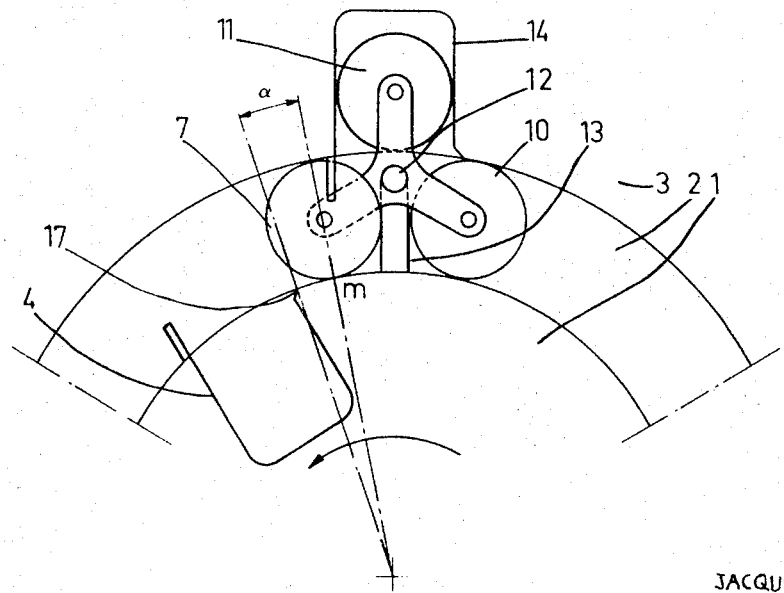

In the position of FIG. 6 the element 1 may stop after rotation by an additional angle α, with respect to the locking position of element 2 (shown in FIG. 5). An electric microcontactor system 20, S (shown in FIG. 5) may, during said additional rotation, issue an information signal indicating the stopping of element 2, which is transmitted through a remote transmission cable 21 as well as an order for stopping the motor M.

This angle α is not obligatorily of a constant value but may vary within a fair range. It has no influence on the stopping position of the valve body or the barrel since the element 2 solid therewith is already locked in the position of FIG. 5. Moreover, even if, as a result of vibrations, the element 1 rotates slightly (by an angle lower than α), the valve body or barrel is kept strictly in the position defined by the position of element 2 in FIG. 5 and cannot rotate in any direction.

In the position of FIG. 7, the direction of movement of the driving member has been reversed and the element 1 rotates in the opposite direction.

The abutment 16 connected to element 1 forces the roller 7 to engage the recess 4 of element 1, thereby causing the disengagement of the roller 11 from the recess 14.

During this operation the element 2 begins to rotate in the same direction as element 1.

In the position of FIG. 8, the connection member 5 drives the element 2 at the same speed as the element 1, and therefore the valve body or barrel rotates.

FIGS. 3 to 8 show the locking of element 2 in a single position.

It is of course possible to provide several recesses like 4 and 14 respectively in the elemtns 1 and 3, for example at an angle of 90°, so that the device be adapted to control conventional valves.

Means for modifying the relative position of recesses 4 and 14 may be used, such means allowing an adjustement in the revolution of element 2 as hereinabove indicated with reference to FIG. 2A.

In the modified embodiment illustrated in FIG. 9, the clenching means for the connection member in any of the recesses 4 and 14 no longer consists of abutments such as abutments 15 and 16 of the above-described embodiments but are formed by springs 18 and 19 placed in the bottom of recesses 4 and 14.

In the position of FIG. 9, the spring 18 is compressed and upon release, will force the roller 11 into the recess 14 as soon as they will register during the rotation of element 2.

The embodiment shown in FIG. 10 relates to the case where the element 2 is driven in a rectilinear movement.

What I claim as my invention is :

1. A device for stopping a driven member at an accurately defined position comprising:
    a driving member,
    a driven member,
    a stationary member,
    and connection means for selectively connecting said driven member to one of said driving member and said stationary member,
    said driving member having a first recess formed therein, said stationary member having a second recess formed therein, said driving member and said stationary member being spaced from one another in a direction perpendicular to the direction of displacement of said driven member to form a guide path for said connection means, said guide path having substantially the same width as said first and second recesses,
    said connection means including a plurality of arms articulated about a pivot carried by said driven member, each of said arms having a roller at the outer end thereof, a first of said rollers being engaged with a slight play in said first recess to drivingly connect said driving and driven members during displacement of said driven member, a second of said rollers being maintained in said guide path during displacement of said driven member until said first and second recesses are removed close to one another to a position where said second roller becomes engaged with said second recess to lock said driven member to said stationary member while said first roller simultaneously disengages from said first recess upon pivoting of said arms about said pivot, whereby said driven member is automatically engaged with said driving member for predetermined displacement and is automatically disengaged from said driven member and locked to said stationary member after said predetermined displacement.

2. A device according to claim 1, wherein clenching means are provided on said stationary member for automatically effecting the pivoting of said arms when said second roller becomes aligned with said second recess.

3. A device according to claim 1, wherein said connection means includes three arms with rollers at the ends thereof, a third one of said rollers being positioned in said guide path at all times during operation of the device.

4. A device according to claim 3, wherein said first roller is in said guide path when said second roller is completely engaged in said second recess.

5. A device according to claim 1, wherein said driven member is rotatably drivable and wherein said guide path is annularly shaped and extends at the outer circumference of a portion of said driven member.

6. A device according to claim 2, wherein said driven member is rotatably drivable and wherein said guide path is annularly shaped and extends at the outer circumference of a portion of said driven member.

7. A device according to claim 3, wherein said driven member is rotatably drivable and wherein said guide path is annularly shaped and extends at the outer circumference of a portion of said driven member.

8. A device according to claim 1, wherein said pivot is displaceable with a slight play in a slot provided in said driven member in a direction perpendicular to the direction of displacement of said driven member.

9. A device according to claim 2, wherein said clenching means consist of abutments provided on said first stationary element.

10. A device according to claim 2, wherein said clenching means consists of repelling resilient members respectively placed at the bottom of said second recess and at the bottom of said first recess.

11. A device according to claim 1, comprising means for remote information which are actuated when the driven member has reached its stopping position.

12. A device according to claim 11, wherein said means for remote information comprise an electric contact device.

13. A device according to claim 1, comprising means for stopping the movement of said driving means, which are actuated when the driven member has reached its stopping position.

14. A device according to claim 13, wherein said means for stopping the movement comprise an electric contact device.

* * * * *